US 8,418,368 B2

(12) United States Patent
Horling et al.

(10) Patent No.: US 8,418,368 B2
(45) Date of Patent: Apr. 16, 2013

(54) BEARING ASSEMBLY WITH ELASTOMERIC SLEEVE ELEMENT

(75) Inventors: Peter Horling, Schonungen-Mainberg (DE); Edgar Pickel, Sommerach (DE)

(73) Assignee: Aktiebolaget SKF, Göteborg (SE)

( * ) Notice: Subject to any disclaimer, the term of this patent is extended or adjusted under 35 U.S.C. 154(b) by 328 days.

(21) Appl. No.: 12/789,975

(22) Filed: May 28, 2010

(65) Prior Publication Data

US 2011/0002571 A1   Jan. 6, 2011

(51) Int. Cl.
*B21D 53/10* (2006.01)

(52) U.S. Cl.
USPC ............... 29/898.049; 29/898; 29/898.04; 29/898.047; 29/898.07; 264/46.7; 264/242

(58) Field of Classification Search ....... 29/898–898.15; 16/98; 264/261, 242, 263, 46.7; 301/5.7; 384/298; 474/161, 190
See application file for complete search history.

(56) References Cited

U.S. PATENT DOCUMENTS

| | | | | |
|---|---|---|---|---|
| 2,865,692 A | * | 12/1958 | Gossmann | 384/298 |
| 3,362,760 A | | 1/1968 | Sernetz | |
| 3,904,731 A | * | 9/1975 | Orkin et al. | 264/242 |
| 4,109,343 A | * | 8/1978 | Weis et al. | 16/98 |
| 5,120,279 A | * | 6/1992 | Rabe | 474/161 |

FOREIGN PATENT DOCUMENTS

| | | |
|---|---|---|
| AT | 215887 B | 6/1961 |
| DE | 1738837 U | 1/1957 |
| DE | 2400701 A1 | 7/1974 |
| DE | 2801879 A1 | 11/1978 |
| DE | 3722052 A1 | 1/1989 |
| DE | 19623612 A1 | 12/1996 |
| GB | 592043 A | 9/1947 |
| GB | 1589904 A | 5/1981 |

* cited by examiner

*Primary Examiner* — Richard Chang
(74) *Attorney, Agent, or Firm* — Mark A. Ussai; Bryan Peckjian

(57) ABSTRACT

A process for producing a bearing assembly includes positioning a first sleeve element in an injection mould, the injection mould having a cylindrical recess with a diameter for receiving the first sleeve element and the outside diameter of the first sleeve element being lesser than the diameter of the recess. A second sleeve element is positioned concentrically within the first sleeve element in the injection mould to define an annular chamber and elastomeric material in a molten state is injected under pressure into the annular chamber between the sleeve elements such that the outside diameter of the first sleeve element is expanded. The elastomeric material is allowed to solidify in the annular chamber between the two sleeve elements and the assembly of sleeves and elastomeric material are removed as a unit from the injection mould.

7 Claims, 4 Drawing Sheets

BEARING ASSEMBLY WITH ELASTOMERIC SLEEVE ELEMENT

The present invention relate to bearings, and more particularly to bearing assemblies for rotatably coupling a shaft with a roller.

The prior art discloses diverse possibilities for mounting support rollers, and these include the special refinement of providing improved damping by arranging a layer of damping material between the support roller casing and the bearing, which is mostly in the form of a rolling bearing.

DE 1 738 837 U discloses a bearing assembly of the generic type. Here, use is made of an elastomeric damping layer which is block-shaped in radial section and the two axial end regions of which are provided with constrictions. This damping layer makes it possible to achieve a high damping capability of the bearing assembly. A similar solution is known from GB 592 043 A.

DE 28 01 879 A1 discloses a further similar bearing assembly, wherein the bearing supports a sleeve via an elastomeric intermediate layer. The sleeve is radially widened in an axial end region and is welded at its radially outer region onto the cylindrical inner surface of the support roller casing.

Similar bearing assemblies for mounting a support roller in a damped fashion are known from AT 215 887, DE 24 00 701 A1 and U.S. Pat. No. 3,362,760.

The damping layer is constricted, in particular in the end region, mostly because the material of the damping layer has a relatively high volume shrinkage after it has been moulded or vulcanized onto the surrounding components. After the injection moulding of elastomeric material, the volume thereof can shrink by several per cent, for example up to 4.5%, and so corresponding contractions are produced.

This has the disadvantageous result that tensile stresses occur in the elastomeric material, and these can result in the elastomeric material becoming detached from a surrounding component at the contact surfaces which adjoin the latter. This weakens the mechanical assembly and also reduces the ability to damp vibrations. In the case of a bearing assembly of the generic type, this may have the result that the elastomeric material is detached from an adjoining sleeve or from the bearing ring or from a bearing carrier, at least in partial regions, and the adhesion to said parts is thereby lost.

SUMMARY OF THE INVENTION

The invention is based on the object of developing a process for producing a bearing assembly of the type mentioned in the introduction, and a corresponding bearing assembly, in such a way as to ensure that material does not become detached from components which surround the damping layer even if the material of the damping layer experiences volume shrinkage, such that the function of the damping layer is completely maintained.

In terms of the process, this object is achieved by the invention by virtue of the following steps:

providing a first sleeve element and a second sleeve element;

positioning the first sleeve element in an injection mould, the injection mould having a cylindrical recess with a diameter for receiving the first sleeve element, the outside diameter of the first sleeve element being lesser than the diameter of the recess;

positioning the second sleeve element concentrically within the first sleeve element in the injection mould so as to form an annular chamber between the two sleeves;

injecting an elastomeric material in the molten state under pressure into the annular chamber between the two sleeve elements such that the outside diameter of the first sleeve element is expanded;

allowing the elastomeric material to solidify in the annular chamber between the two sleeve elements so as to form a ring of elastomeric material; and removing as an assembly the two sleeve elements and the ring of elastomeric material from the injection mould.

The invention is therefore based on the fact that the first sleeve element is expanded elastically by the pressure applied during the injection moulding of the elastomer. As a result of the contraction of the first sleeve element after this pressure has been removed, the sleeve element returns elastically to its original position and therefore subjects the now solidified elastomer to radial compressive stresses, and so radial tensile stresses, which would otherwise be feared owing to the contraction of the elastomer as it solidifies, cannot occur.

The pressure during the injection of the elastomeric material or of the rubber material as per step c) above is preferably selected in such a way that the outer circumference of the first sleeve element bears against the cylindrical recess of the injection mould. The pressure during the injection of the elastomeric material or of the rubber material is preferably at least 300 bar, preferably at least 1000 bar.

A holding pressure can be maintained in the molten elastomeric material or in the rubber material at least for a certain time during step d) above, such that volume shrinkages of the elastomer can immediately be at least partially eliminated.

It is preferable for no radial tensile stresses to be present in the elastomeric material or in the rubber material after removal from the mould as per step e) above.

Before the injection of the elastomeric material or of the rubber material, an adhesion promoter can be applied to the contact surface of the first sleeve element and/or of the second sleeve element with the elastomeric material or the rubber material. This makes it possible to improve the adhesion of the elastomer to the sleeve elements.

The outside diameter of the first sleeve element, in the stress-free state, is preferably between 95% and 99.5% of the diameter of the recess in the injection mould.

Before the injection of the elastomeric material or of the rubber material, the first sleeve element is preferably positioned concentrically with respect to the recess in the injection mould. It can then further be provided that the radial gap between the recess of the injection mould and the outer circumference of the first sleeve element measures between 0.1 mm and 1.0 mm, preferably between 0.2 and 0.3 mm.

The bearing assembly according to the invention comprises at least a first sleeve element and a second sleeve element arranged concentrically with respect to the first sleeve element, wherein a ring of elastomeric material is arranged between the two sleeve elements. The invention provides that, when the two sleeve elements are free of stresses or forces, the elastomeric material or the rubber material of the ring is free of radial tensile stresses.

The unit comprising the two sleeve elements together with the ring of elastomeric material can be arranged between a bearing and a support roller.

The bearing is preferably a rolling bearing, in particular a deep-groove ball bearing.

An intermediate carrier can also be arranged between the outer race of the bearing and the unit comprising the two sleeve elements together with the ring of elastomeric material.

At least certain portions of the support roller mostly have a hollow-cylindrical design.

There is preferably a fixed connection, in particular a frictional or positive connection, between the first sleeve element and the support roller. However, it is also conceivable for there to be an integral bond, e.g. a soldered or welded join.

Therefore, the receiving cavity of the injection mould is preferably larger by a certain geometric amount than would correspond to the first sleeve element. This amount is selected on the basis of the shrinkage volume of the elastomeric material to be injected (e.g. 0.5 mm in diameter).

During the injection of the molten elastomer at an appropriately high injection moulding pressure, the first sleeve element is expanded elastically. During subsequent cooling and solidifying of the injected material, the first sleeve element, which is then subjected to tangential stress, follows the elastomer which shrinks owing to the volume contraction.

An advantageous result of this is that radial compressive stresses are maintained in the elastomer of the ring. This can occasionally be seen in that there are no end-side sink marks in the elastomer or rubber layer.

The elastomeric material is mostly introduced by conventional injection moulding. The same also applies, of course, in the case of rubber when carrying out the vulcanization process required for curing.

The proposed procedure ensures significantly improved adhesion of the elastomer on the sleeve elements, i.e. the previous adhesion problems no longer occur.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
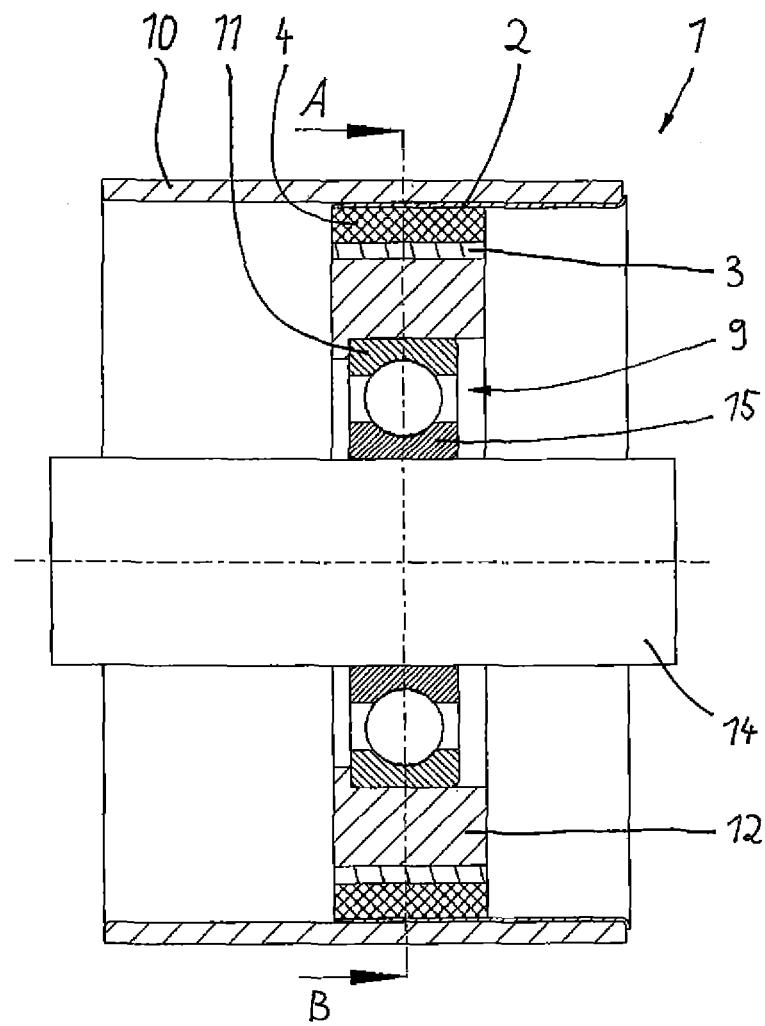
FIG. 1 schematically shows the radial section through a bearing assembly, in which a rolling bearing in the form of a deep-groove ball bearing is used for mounting a support roller with respect to a shaft element.

FIG. 1 shows a bearing assembly 1 in radial section, by means of which a support roller 10 (shown only in part) is mounted with respect to a shaft element 14.

For this purpose, use is made of a bearing 9 in the form of a deep-groove ball bearing. The inner race 15 of this bearing is fixed to a shaft element 14. The outer race 11 is arranged in an intermediate carrier 12 which, for its part, is part of a unit comprising a first sleeve element 2 and a second sleeve element 3 with a ring 4 of elastomeric material (e.g., natural or synthetic rubber, etc.) arranged therebetween.

Whereas the first sleeve element 2 is connected fixedly to the support roller 10, the second sleeve element 3 is connected to the intermediate carrier 12. Accordingly, the ring 4 of elastomeric material provides damping mounting of the support roller 10 with respect to the shaft element 14, as corresponds to a construction which is known per se.

Figure 2:
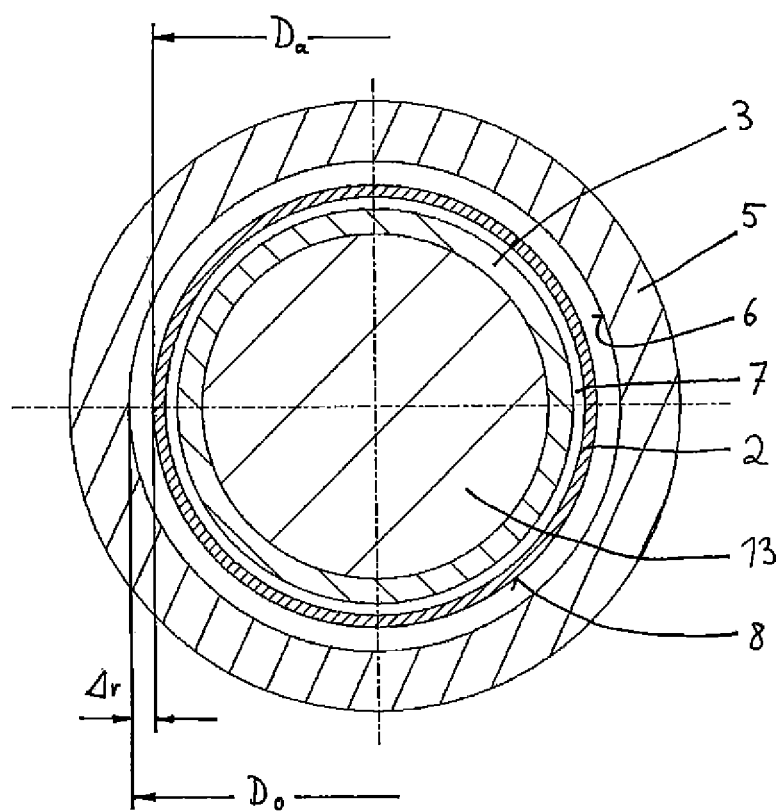
FIG. 2 shows an injection mould with a first and a second sleeve element inserted therein, before the injection of elastomeric material, analogously to the section A-B shown in FIG. 1.
Figure 4:
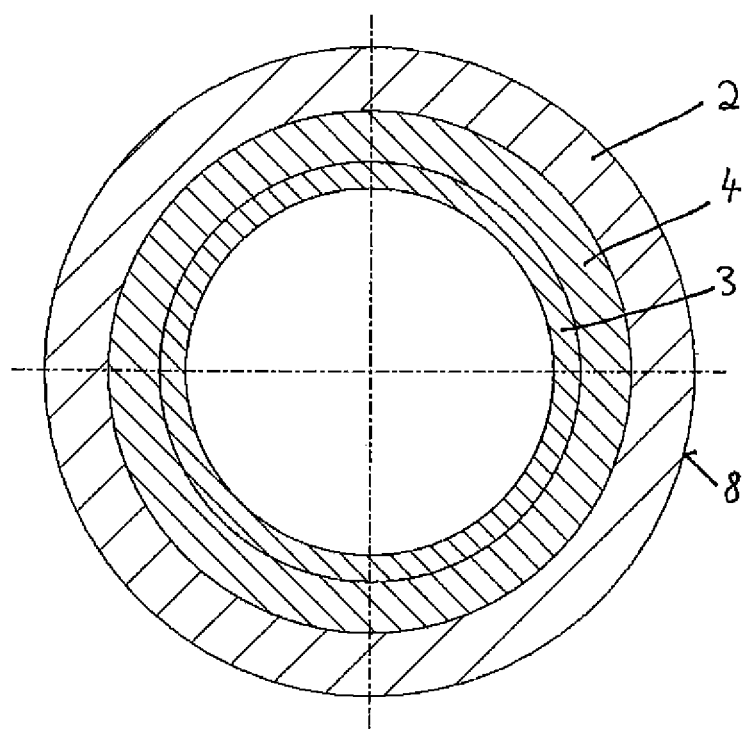
FIG. 4 shows the unit comprising the first and the second sleeve element with a ring of elastomeric material arranged therebetween, after removal from the injection mould.

Therefore, use is made of the unit comprising the first sleeve element 2 and the second sleeve element 3 with the ring 4 of elastomeric material arranged therebetween. This unit is shown in FIG. 4, in the form intended to be installed in the bearing assembly 1 shown in FIG. 1. This unit is produced in the following way:

In a first process step, the sleeve elements 2 and 3 consisting of sheet steel are placed in an injection mould 5, as can be seen in FIG. 2. The injection mould 5 has a circular recess 6, which defines the cavity of the injection mould 5. The first sleeve element 2 is inserted into the cavity of the injection mould 5, to be precise concentrically with respect to the circular recess 6. As can be seen in FIG. 2, the outside diameter $D_a$ of the outer circumference 8 of the first sleeve element 2 is slightly smaller (this is shown in exaggerated fashion in FIG. 2) than the diameter $D_0$ of the recess 6, preferably the outside diameter $D_2$ of the first sleeve element 2 has a value in a stress-free state of between 95% and 99.5% of the diameter $D_0$ of the injection mould recess 6. Therefore, there is a radial gap $\Delta r$ between the recess 6 and the outer circumference 8, which is preferably within the range of about 0.1 mm to about 1.0 mm.

The second sleeve element 3 is positioned concentrically with respect to the recess 6 and to the first sleeve element 2 in the injection mould 5, and is held by a mandrel 13. Specifically, the second sleeve element 3 is inserted within a central bore of the first sleeve element 2.

Accordingly, an annular chamber 7 is produced or formed between the two sleeve elements 2, 3, and this annular chamber is to be filled with elastomeric material. Further, each one of the first sleeve 2 and the second sleeve 3 has a contact surface for contacting the elastomeric material, specifically the inner surface of the first or "outer" sleeve element 2 and the facing outer surface of the second or "inner" sleeve element 3 which define the annular chamber 7. Prior to injecting the elastomeric material into the annular chamber 7, an adhesion promoter is preferably applied to at least one, and preferably both, of the contact surfaces of the sleeves 2, 3.

Figure 3:
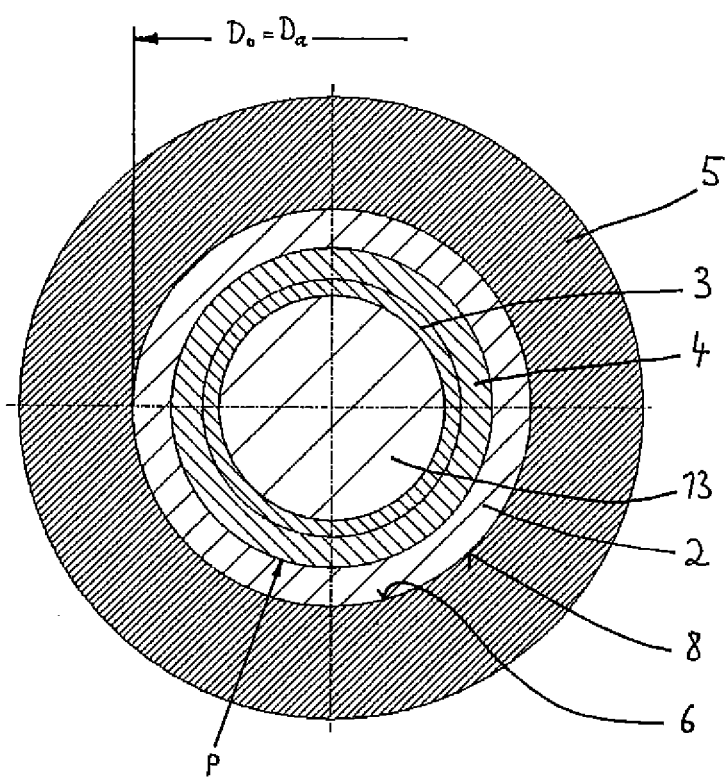
FIG. 3 shows, in the illustration shown in FIG. 2, the process step of injecting elastomeric material between the two sleeve elements.

This process is shown schematically in FIG. 3. Injection-mouldable elastomeric material is injected into the annular chamber 7 at high pressure p. Here, the pressure p is selected such that it expands the first sleeve element 2, to be precise preferably in such a way that the outer circumference 8 of the first sleeve element 2 bears against the recess 6 of the injection mould 5 (see FIG. 3). Preferably, the pressure p during the injection of the elastomeric material is at least 300 bar.

While the elastomeric material is curing or hardening, after the molten material has been injected, a holding pressure is preferably maintained in the molten material for a predetermined period of time in order to at least partially compensate for shrinkages of the elastomeric material.

If the unit comprising the sleeve elements 2 and 3 together with the ring 4 is removed from the injection mould 5 after the elastomeric material has cured, the first sleeve element 2 contracts radially, as a result of which radial compressive stresses are always maintained in the elastomeric material, despite the volume contraction which occurs during cooling. As a result, radial tensile stresses within the ring of elastomeric material 4 are substantially zero, i.e., no radial tensile stresses are present in the elastomeric material.

This prevents the above-mentioned adhesion problems which otherwise represent a weak point of the bearing assembly.

Further, the bearing assembly preferably further comprises a bearing 9 and a support roller 10 disposed about the bearing 9, with the assembly of the first and second sleeves and the ring of elastomeric material being positioned between the bearing 9 and the roller 10. The bearing 9 is preferably any appropriate type of rolling bearing, such as for example, a deep-groove ball bearing, and at least a portion of the support roller 10 is generally hollow-cylindrical.

Furthermore, the bearing assembly may further comprise an intermediate carrier 12 disposed between the outer race 11 of the bearing 9 and the assembly of the first and second sleeve elements 2, 3 and the ring of elastomeric material 4. Preferably, the first sleeve element 2 is frictionally connected with the support roller 10, so as to fixedly connect the sleeve element 2 and roller 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A process for producing a bearing assembly comprising:
   positioning a first sleeve element defining an outside diameter in an injection mould, the injection mould having a cylindrical recess with a diameter for receiving the first sleeve element, the outside diameter of the first sleeve element being lesser than the diameter of the recess, wherein the outside diameter of the first sleeve element has a value in a stress-free state of between 95% and 99.5% of the diameter of the recess of the injection mould;
   positioning a second sleeve element concentrically within the first sleeve element in the injection mould so as to form an annular chamber between the first and second sleeve elements;
   injecting an elastomeric material in a molten state under a pressure into the annular chamber between the first and second sleeve elements such that the outside diameter of the first sleeve element is expanded;
   allowing the elastomeric material to solidify in the annular chamber between the first and second sleeve elements so as to form a ring of elastomeric material; and
   removing as an assembly the first and second sleeve elements and the ring of elastomeric material from the injection mould, wherein, after removing the assembly from the injection mould, radial tensile stresses within the ring of elastomeric material are substantially zero.

2. The process as recited in claim 1 wherein the pressure during the injection of the elastomeric material is selected such that an outer circumference of the first sleeve element bears against the cylindrical recess of the injection mould.

3. The process as recited in claim 1 wherein the pressure during the injection of the elastomeric material is at least 300 bar.

4. The process as recited in claim 1 wherein a holding pressure is maintained in the molten elastomeric material at least for a predetermined time during the solidifying of the elastomeric material.

5. The process as recited in claim 1 wherein:
   each of the first sleeve element and the second sleeve element has a contact surface for contacting the elastomeric material; and
   the process further comprises applying an adhesion promoter to the contact surface of at least one of the first and second sleeves before injecting the elastomeric material into the annular chamber.

6. The process as recited in claim 1 wherein positioning the first sleeve within the injection mould includes positioning the first sleeve element concentrically within the recess of the injection mould.

7. The process as recited in claim 6 wherein a radial gap is defined between the recess of the injection mould and an outer circumference of the first sleeve element, the radial gap having a value within the range of about 0.1 mm to about 1.0 mm.

* * * * *